(12) United States Patent
Huang et al.

(10) Patent No.: US 9,052,332 B2
(45) Date of Patent: Jun. 9, 2015

(54) PIEZORESISTIVE TYPE Z-AXIS ACCELEROMETER

(75) Inventors: Chih-Wei Huang, Taipei (TW); Chieh-Pin Chang, Taipei (TW); Ja-Hao Chen, Taipei (TW); Chuan-Jane Chao, Hsinchu (TW); Ying-Zong Juang, Taipei (TW); Shyh-Chyi Wong, Taipei (TW); Yeong-Her Wang, Taipei (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 240 days.

(21) Appl. No.: 13/484,681

(22) Filed: May 31, 2012

(65) Prior Publication Data

US 2013/0091949 A1    Apr. 18, 2013

(30) Foreign Application Priority Data

Oct. 12, 2011 (TW) .............................. 100136886 A

(51) Int. Cl.
*G01P 15/09* (2006.01)
*G01P 15/08* (2006.01)
*G01P 15/12* (2006.01)

(52) U.S. Cl.
CPC ........... *G01P 15/0802* (2013.01); *G01P 15/123* (2013.01); *G01P 2015/0837* (2013.01)

(58) Field of Classification Search
CPC .................................................. G01P 15/123
USPC ............ 73/514.33, 514.34, 862.045, 862.044
See application file for complete search history.

(56) References Cited

U.S. PATENT DOCUMENTS

| 4,849,730 | A | * | 7/1989 | Izumi et al. ....................... 338/2 |
| 5,542,297 | A | * | 8/1996 | Mizuno et al. ............. 73/514.36 |
| 5,959,209 | A | * | 9/1999 | Takeuchi et al. ........... 73/514.34 |
| 6,959,259 | B2 | | 10/2005 | Vock et al. |
| 2004/0123664 | A1 | * | 7/2004 | Ohtoyo et al. ............. 73/514.33 |
| 2006/0130583 | A1 | * | 6/2006 | Nakayama .................. 73/514.33 |
| 2008/0271535 | A1 | * | 11/2008 | Hattori et al. .............. 73/514.33 |
| 2010/0270889 | A1 | * | 10/2010 | Xu et al. ........................ 310/329 |
| 2011/0175177 | A1 | * | 7/2011 | Liou .............................. 257/415 |
| 2011/0239784 | A1 | * | 10/2011 | Ohsato ..................... 73/862.044 |
| 2013/0091949 | A1 | * | 4/2013 | Huang et al. .............. 73/514.34 |

FOREIGN PATENT DOCUMENTS

| CN | 2162654 | 4/1994 |
| CN | 101814860 | 8/2010 |
| CN | 101860262 | 10/2010 |

(Continued)

OTHER PUBLICATIONS

Chinese language office action dated Feb. 8, 2014.
Taiwanese language office action dated Mar. 25, 2014.

(Continued)

*Primary Examiner* — Hezron E Williams
*Assistant Examiner* — Xin Zhong
(74) *Attorney, Agent, or Firm* — Winston Hsu; Scott Margo

(57) ABSTRACT

A pizeoresistive type Z-axis accelerometer is provided, including a substrate; a plurality of anchors formed over the substrate; a plurality of cantilever beams, wherein the cantilever beams include a piezoresistive material; and a proof mass, wherein the proof mass is suspended over the substrate by respectively connecting the proof mass with the anchors, and the accelerometer senses a movement of the proof mass by the piezoresistive material.

15 Claims, 15 Drawing Sheets

(56) References Cited

FOREIGN PATENT DOCUMENTS

| CN | 201909670 | 7/2011 |
| TW | I230237 | 4/2005 |

OTHER PUBLICATIONS

English language translation of abstract of CN 2162654 (published Apr. 20, 1994).

English language translation of abstract of CN 101814860 (published Aug. 25, 2010).

English language translation of abstract of CN 101860262 (published Oct. 13, 2010).

English language translation of abstract of CN 201909670 (published Jul. 27, 2011).

English language translation of abstract of TW I230237.

\* cited by examiner

PIEZORESISTIVE TYPE Z-AXIS ACCELEROMETER

CROSS REFERENCE TO RELATED APPLICATIONS

This Application claims priority of Taiwan Patent Application No. 100136886, filed on Oct. 12, 2011, the entirety of which is incorporated by reference herein.

BACKGROUND OF THE INVENTION

1. Field of the Invention

The present invention relates to motion sensors, and in particularly to a Z-axis accelerometer.

2. Description of the Related Art

Accelerometers have wide applications such as for inertial navigation systems, automotive safety, and missile control. Z-axis accelerometers can be used to control side air bags, vehicles and multi-axis sensing systems. Normally, z-axis accelerometers are fabricated using bulk micro-machined technology.

According to various operating mechanisms, several types of Z-axis accelerometers such as piezoresistive type accelerometers, piezoelectric type accelerometers, capacitive type accelerometers, thermal type accelerometers and tunneling current type accelerometers have been developed.

BRIEF SUMMARY OF THE INVENTION

An exemplary piezoresistive type Z-axis accelerometer comprises a substrate; a plurality of anchors formed over the substrate; a plurality of cantilever beams, wherein the cantilever beams comprise a piezoresistive material; and a proof mass, wherein the proof mass is suspended over the substrate by respectively connecting the proof mass with the anchors, and the accelerometer senses a movement of the proof mass by the piezoresistive material.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
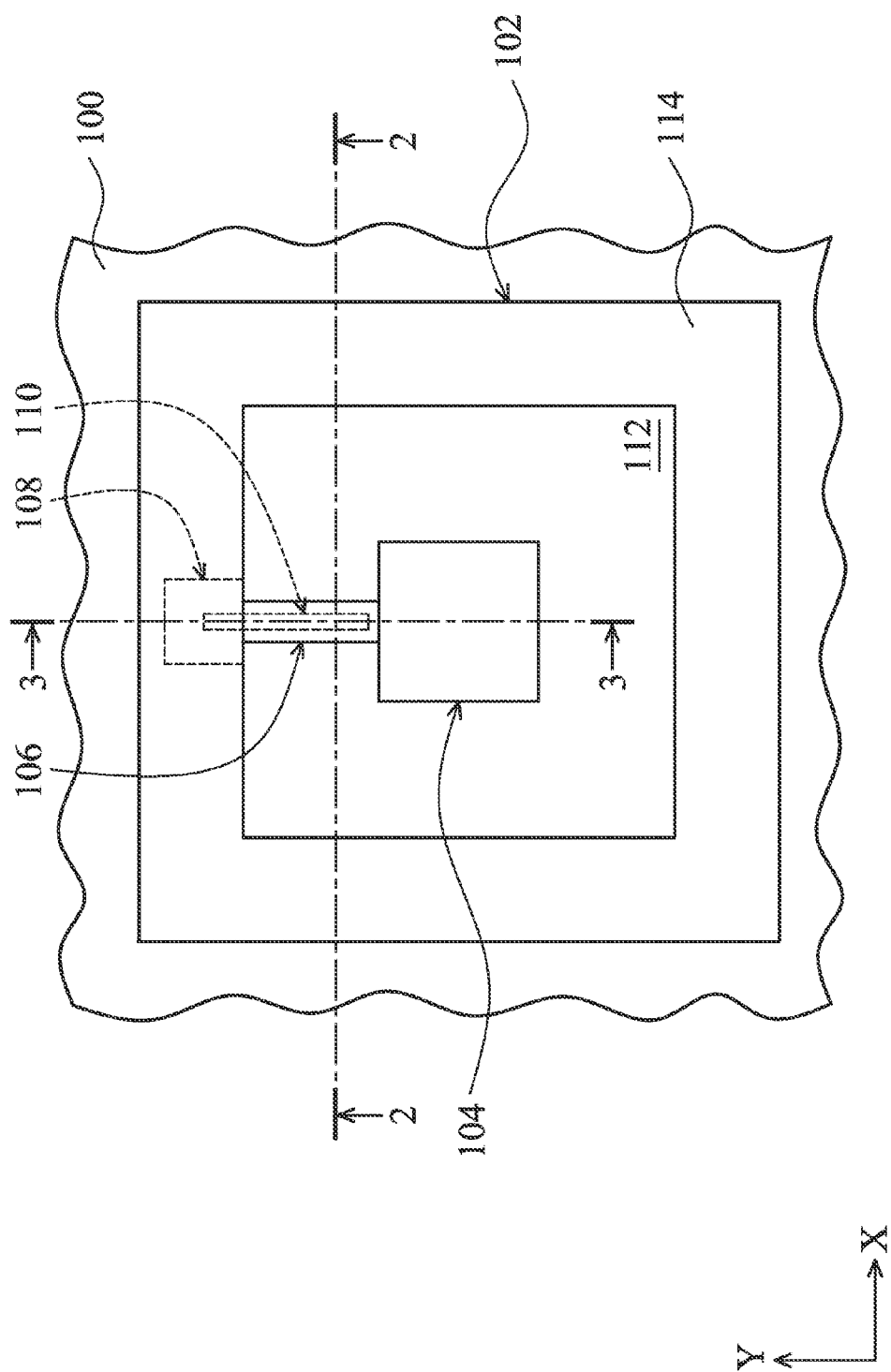
FIG. 1 is a schematic top view of a piezoresistive type Z-axis accelerometer according to an embodiment of the invention.

FIG. 1 is a schematic top view of an exemplary piezoresistive type Z-axis accelerometer. Herein, the exemplary piezoresistive type Z-axis accelerometer is a piezoresistive type Z-axis accelerometer known by the inventors and is used as a comparative example to comment on the reliability problems found by the inventors, but is not used to restrict the scope of the invention.

As shown in FIG. 1, a schematic top view parallel with an X-Y plane of a substrate 100 is illustrated. The piezoresistive type Z-axis accelerometer comprises the substrate 100 and a support frame 102 formed over a portion of the substrate 100, and the support frame 102 defines a cavity 112 within the support frame 102 over the substrate 100. The substrate 100 can be, for example, a bulk silicon substrate, and the support frame 102 is illustrated as a rectangular configuration here, but is not limited thereto. The support frame may be formed as other polygonal configurations.

As shown in FIG. 1, a movable proof mass 104 is disposed within the cavity 112 and is suspended over the substrate 100. The proof mass 104 is connected to a side of a cantilever beam 106 and is supported by thereof, and the other side not connecting to the proof mass of the cantilever beam 106 is embedded within the support frame 102 and disposed over an anchor 108 formed in the support frame 102.

In addition, the piezoresistive type Z-axis accelerometer comprises a piezoresistive material layer 110 (illustrated with dotted line here) to function as a piezoresistor, and the piezoresistive material layer 110 is embedded in the cantilever beam 106 and further extends into a portion of the support frame 102.

Moreover, three additional piezoresistors (not shown) are further provided and disposed in other portions of the substrate 100, and these tree additional piezoresistors are electrically connected to the piezoresistive material layer 110 in the piezoresistive type Z-axis accelerometer shown in FIG. 1 to form t a wheatstone bridge (not shown).

Figure 2:
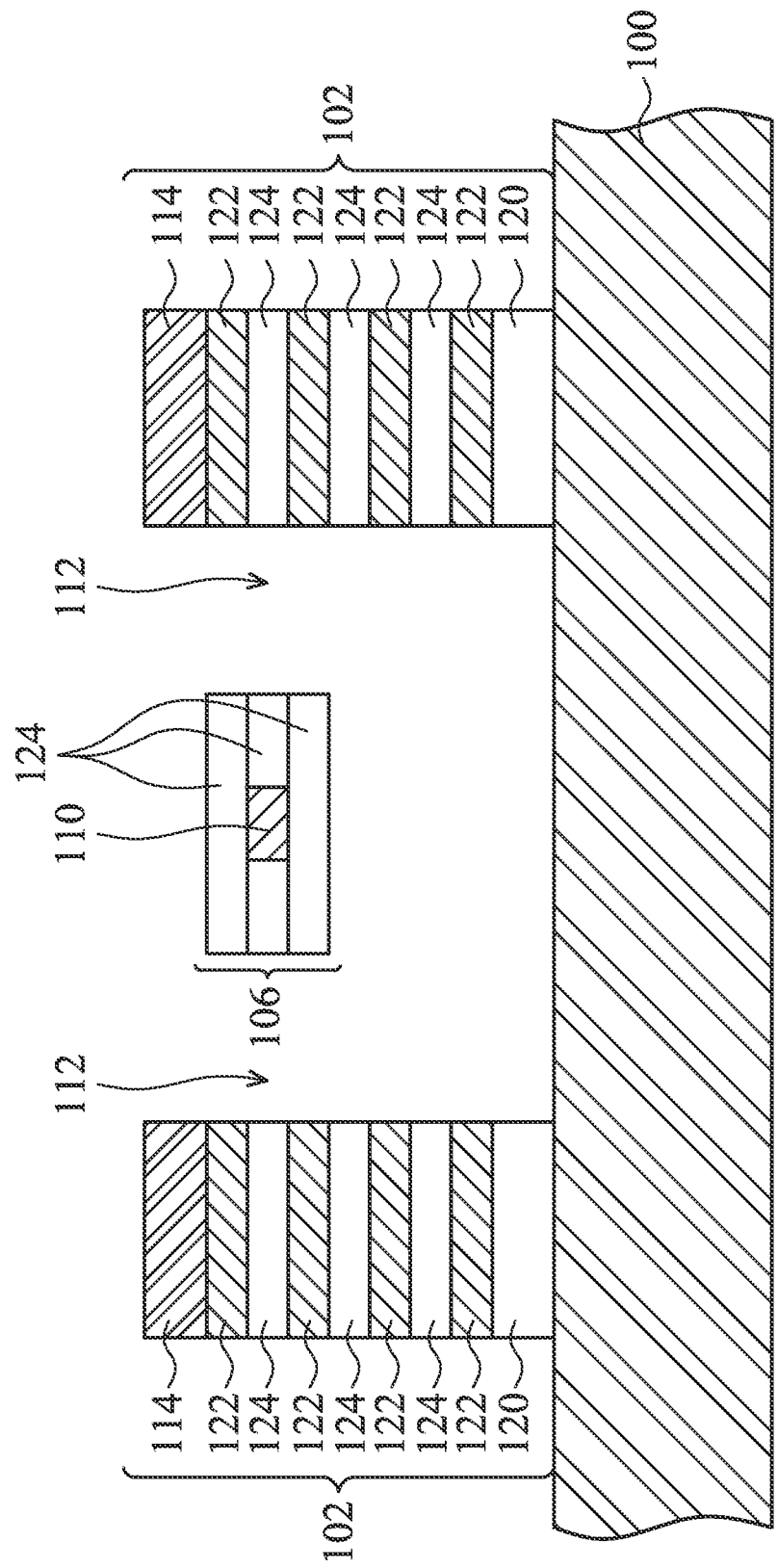
FIG. 2 is a schematic diagram showing a cross section taken along a line 2-2 in FIG. 1.

In FIG. 2, a schematic cross section taken along a line 2-2 in FIG. 1 is illustrated. For the purpose of simplicity, only components such as the cantilever beam 106, the piezoesistive material layers 110 and the support frame 102 are illustrated in FIG. 2. In one embodiment, the support frame 102 comprises an insulating layer 120, a plurality of conductive layers 122, a plurality of dielectric layers 124 and a topmost passivation layer 114 sequentially stacked over the substrate 100. The conductive layer 122 and the dielectric layers 124 are interleaved with each other and are disposed between the insulating layer 120 and the passivation layer 114.

Figure 2A:
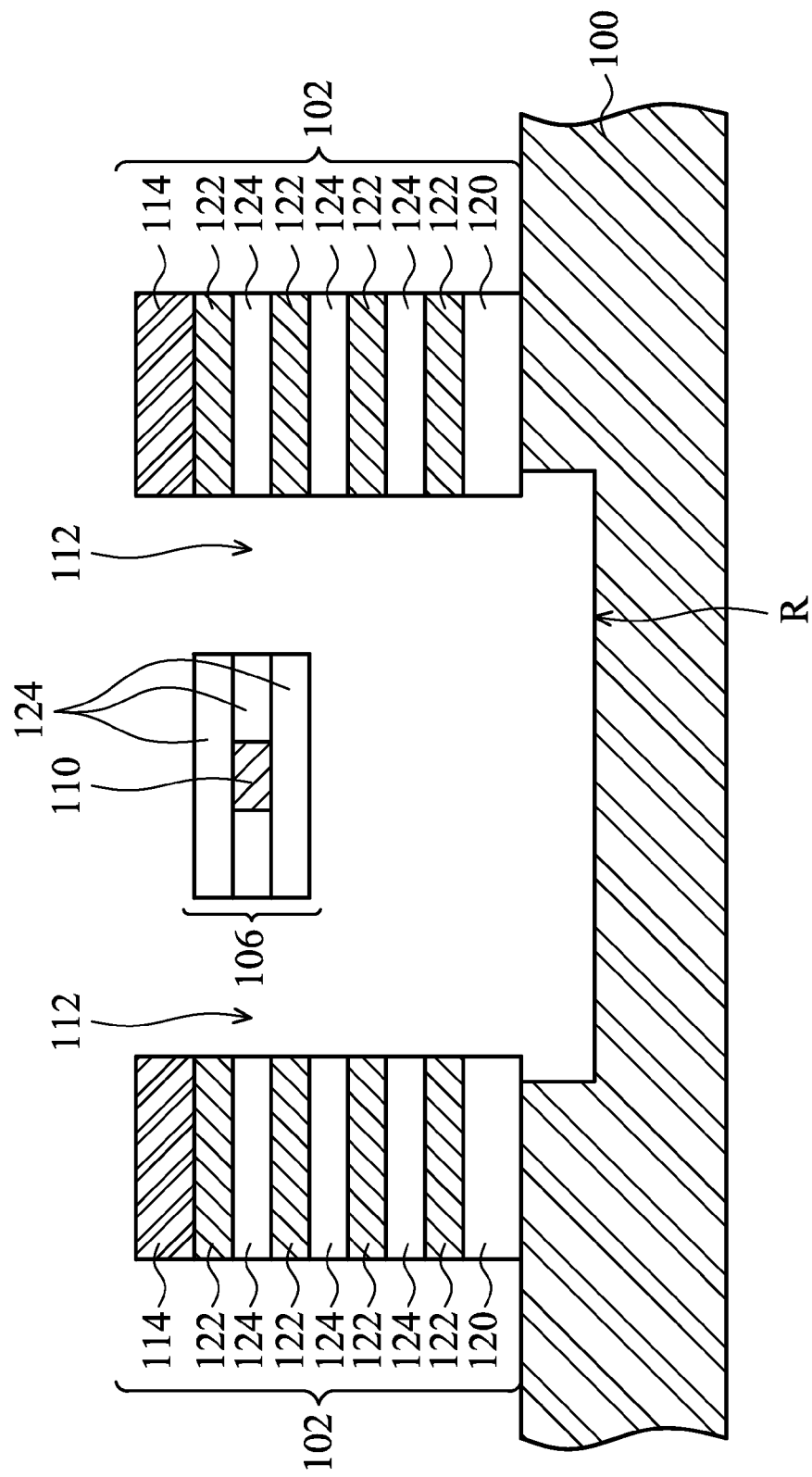
FIG. 2A is another schematic diagram showing a cross section taken along a line 3-3 in FIG. 1.

The conductive layers 122 can be, for example, conductive layers comprising metals such as copper or aluminum, and the dielectric layers 124 can be, for example, intermetal dielectric (IMD) layers comprising dielectric materials such as silicon dioxide and silicon nitride. In another embodiment, the cantilever beam 106 may comprise a plurality of dielectric layers 124 and a piezoresistive material layer 110 composed of, for example, polysilicon materials in one of the dielectric layers 124 embedded within the cantilever beam 106. The dielectric layers 124 in the cantilever beam 106 are simultaneously formed with the dielectric layers 124 in the support frame 102, but a number of the dielectric layers 124 in the cantilever beam 106 is less than a number of the dielectric layer 124 in the support frame 102. In yet another embodiment, a recess R may optionally be formed in the substrate 100 below the cavity 112, and the recess R may partially extend below the support frame 102 to improve a sensitivity of the piezoresistive type Z-axis accelerometer, as shown in FIG. 2A.

Figure 3:
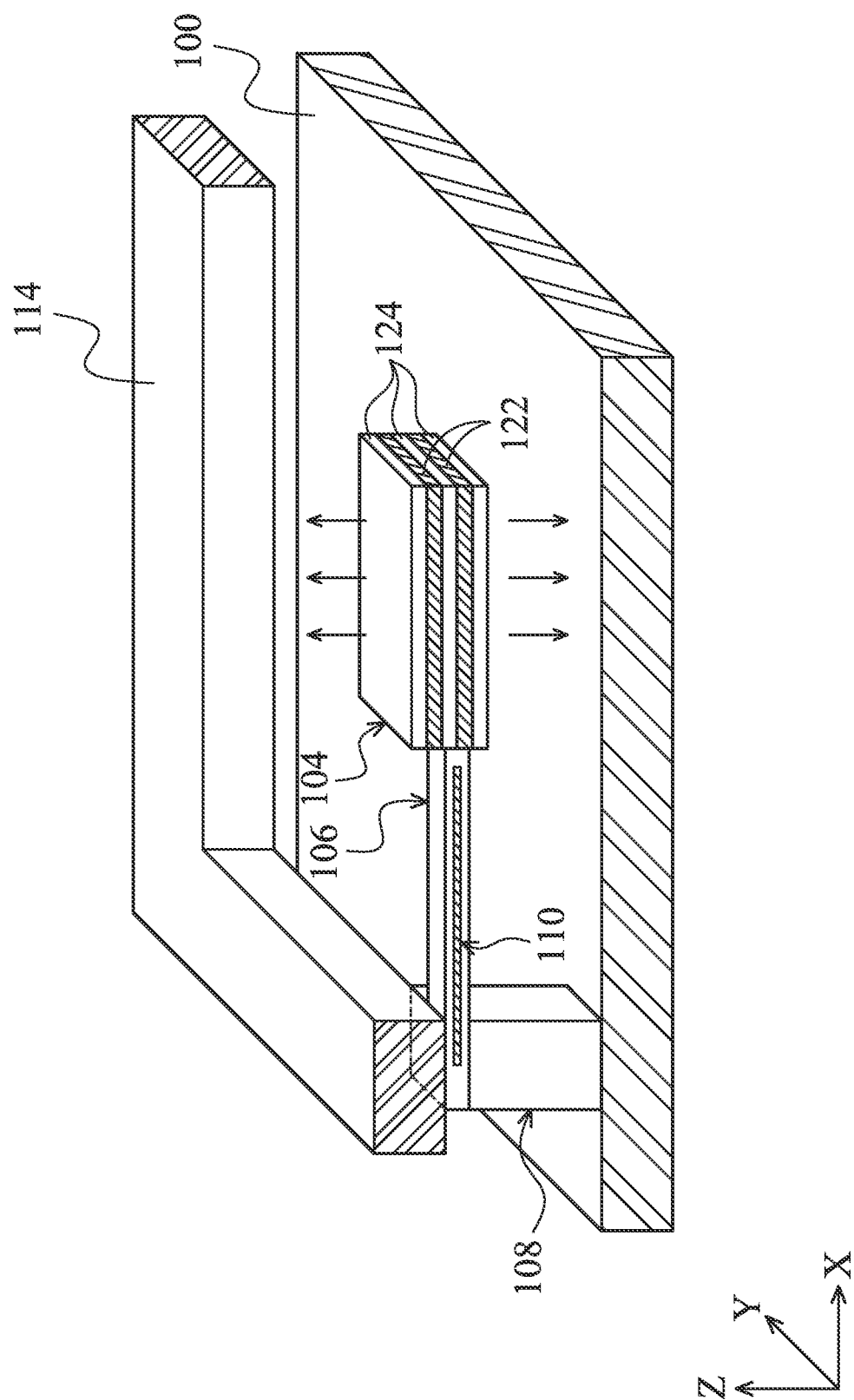
FIG. 3 is a schematic diagram showing a cross section taken along a line 3-3 in FIG. 1.

In FIG. 3, a schematic perspective diagram taken along a line 3-3 in FIG. 1 is illustrated. For the purpose of simplicity, only components such as the passivation layer 114, the cantilever beam 106, the anchor 108, the proof mass 104 and the substrate 100 are illustrated. The proof mass 104 is formed by stacking and interleaving one or a plurality of conductive layers 122 and the dielectric layers 124 together, and a region covered by the passivation layer 114 is substantially where the support frame 102 is.

Herein, the proof mass 104 is under a static status not sensing exterior stresses, such that the proof mass 104, the cantilever beam 106, and the piezoresistive material layer 110 in the cantilever beam 106 are substantially parallel with the X-Y plane of the substrate 100. Numbers of the conductive layers 122 and the dielectric layers 124 in the proof mass 104 can be adjusted according to a need of a practical process and every two conductive layers 122 are isolated by one of the dielectric layers 124.

Figure 4:
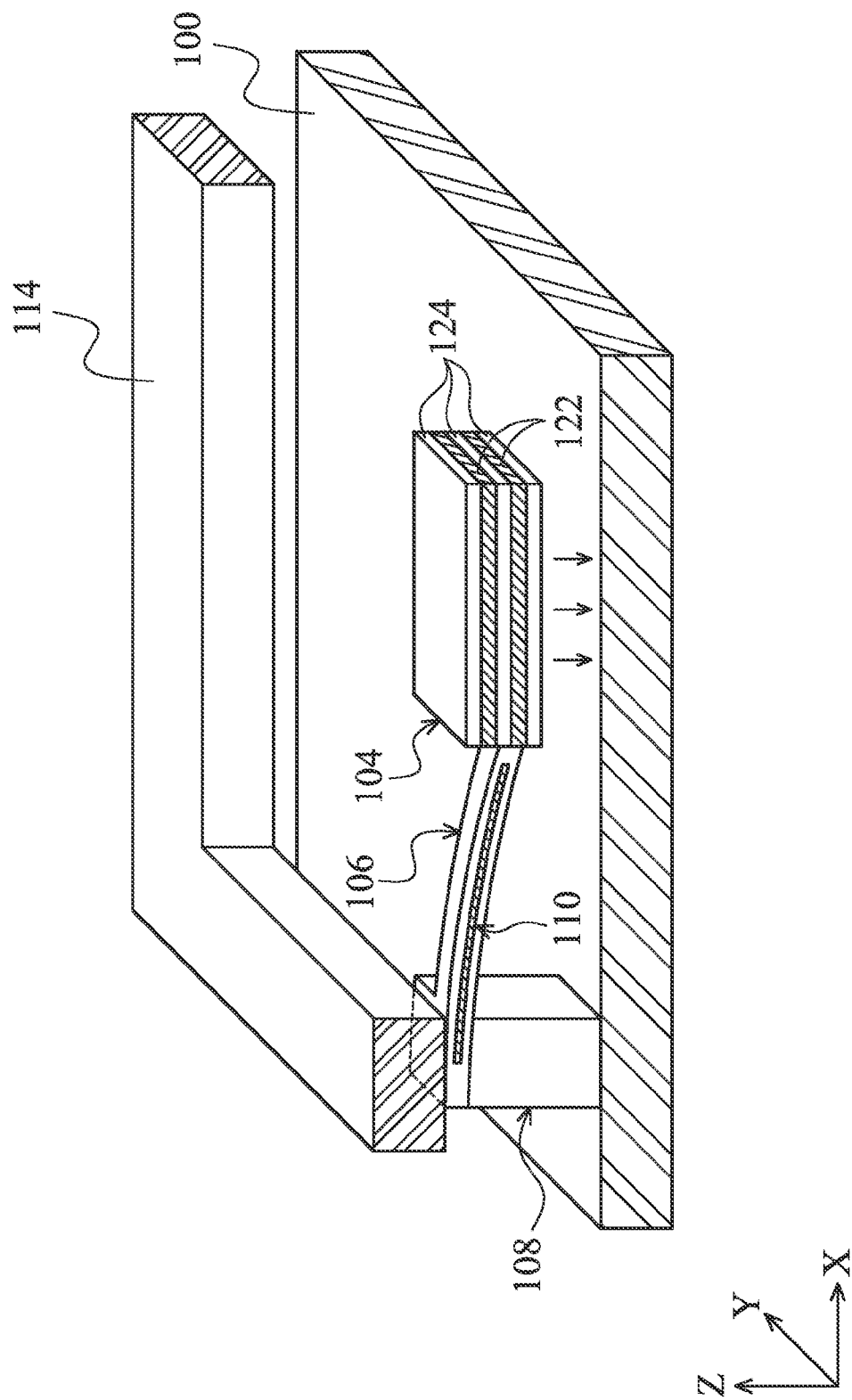
FIG. 4 is a schematic perspective view illustrating that the piezoresistive type Z-axis accelerometer in FIG. 3 has sensed exterior accelerations.

As shown in FIG. 4, a schematic perspective view shows that the piezoresistive type Z-axis accelerometer of FIG. 3 has sensed exterior accelerations. When the exterior accelerations are being sensed, the proof mass 104 performs inertia movements along a Z-axis direction in perpendicular to the X-Y plane, thereby causing deformation of the cantilever beam 106 and changing stress distribution over the cantilever beam 106, such that a resistance of the piezoresistive material layer 110 in the cantilever beam 106 is changed. Therefore, a voltage at two ends of the wheatstone bridge (not shown) that electrically connects with the piezoresistive material layer 110 is changed and an acceleration along the Z-axis direction can be obtained by analyzing an output voltage from the wheatstone bridge by an instrument amplifier (not shown).

Nevertheless, the piezoresistive type Z-axis accelerometer shown in FIGS. 1-4 has the following disadvantages. First, the proof mass 104 is connected to the anchor 108 or the support frame 102 by only a single cantilever beam 106 such that a sensitivity of the piezoresistive material layer 110 in the cantilever beam 106 may be too sensitive, thereby affecting a reliability of the piezoresistive type Z-axis accelerometer. Second, due to connections between the proof mass 104 with the anchor 108 or the support frame 102 are achieved by only one cantilever beam 106, mechanical damages such as cracking may happen at the connection between the cantilever beam 106 and the anchor 108 or the support frame 102 as the number of times the proof mass 104 in the piezoresistive type Z-axis accelerometer is moved is increased, such that reliability thereof is affected.

Accordingly, the structure the piezoresistive type Z-axis accelerometer shown in FIGS. 1-4 is modified to improve a sensitivity of the piezoresistor (i.e. the piezoresistive material layer 110) therein and a connection between the cantilever beam 106 and the anchor 108 or the support frame 102 to improve a reliability of the piezoresistive type Z-axis accelerometer.

Figure 5:
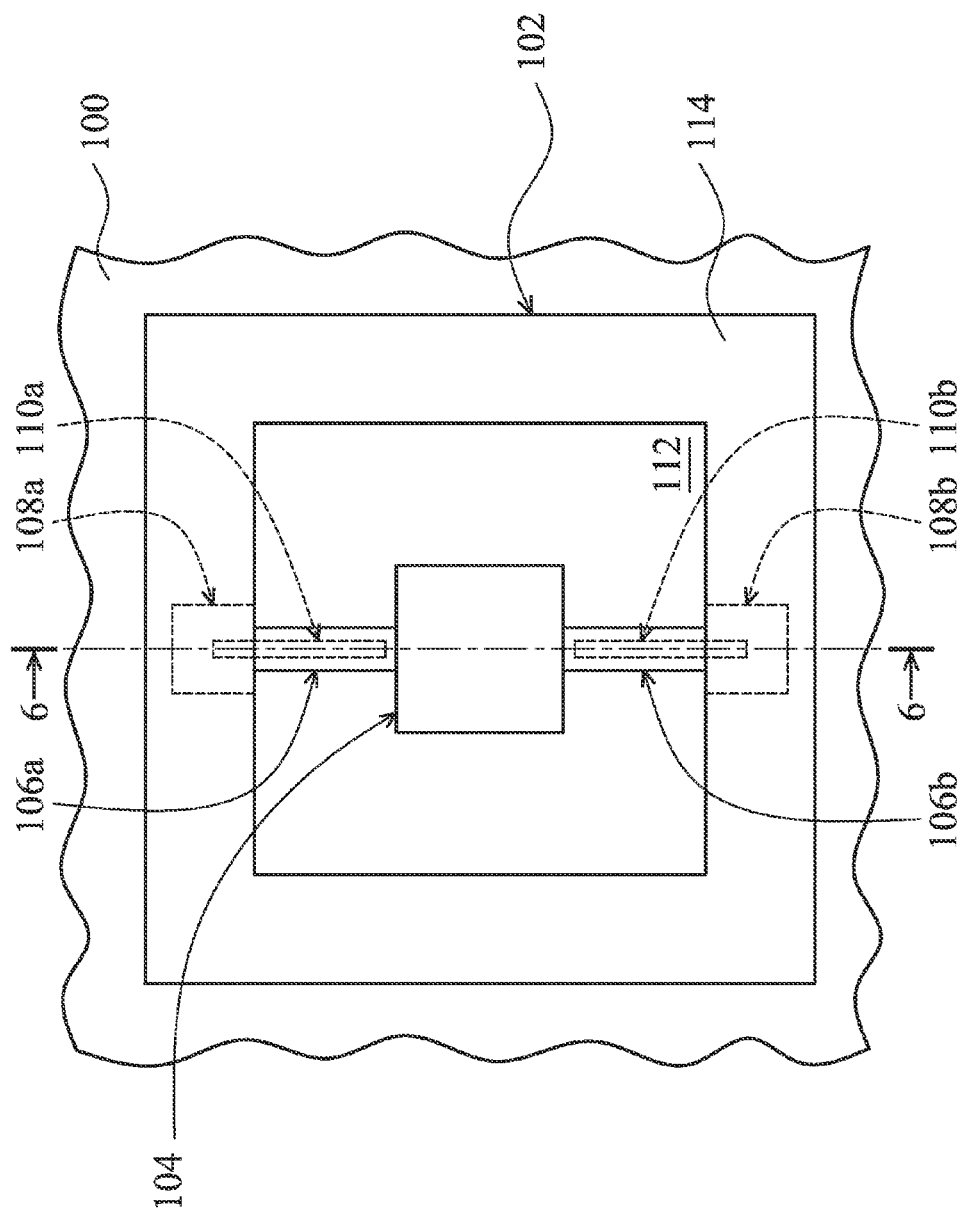
FIG. 5 is a schematic top view of a piezoresistive type Z-axis accelerometer according to another embodiment of the invention.

In FIG. 5, a schematic top view of another exemplary piezoresistive type Z-axis accelerometer is illustrated. As shown in FIG. 5, the exemplary piezoresistive type Z-axis accelerometer is similar with that illustrated in FIG. 1, and a difference therebetween is that two sides of the proof mass 104 in this embodiment are respectively connected with a side of two individual cantilever beams 106a and 106b, and the other side of the individual cantilever beams 106a and 106b not connecting with the proof mass 104 is respectively connected with one of the anchors 108a and 108b formed in the support frame 102. Moreover, the piezoresistive type Z-axis accelerometer in this embodiment comprises two piezoresistive material layers 110a and 110b (illustrated with dotted line here) to function as two piezoresistors, and two piezoresistive material layers 110a and 110b are respectively embedded in one of the cantilever beams 106a and 106b.

As shown in FIG. 5, the piezoresistive material layers 110a and 110b of the piezoresistive type Z-axis accelerometer can be connected in series to form a sensing resistor in a wheatstone bridge (not shown). In this embodiment, configurations of the anchors 108a and 108b, the cantilever beams 106a and 106b, and the piezoresistive material layers 110a and 110b are similar with the configurations of the anchor 108, the cantilever beam 106 and the piezoresistive layer 110 shown in FIGS. 1-4 and are not described and illustrated in detail here.

Figure 6:
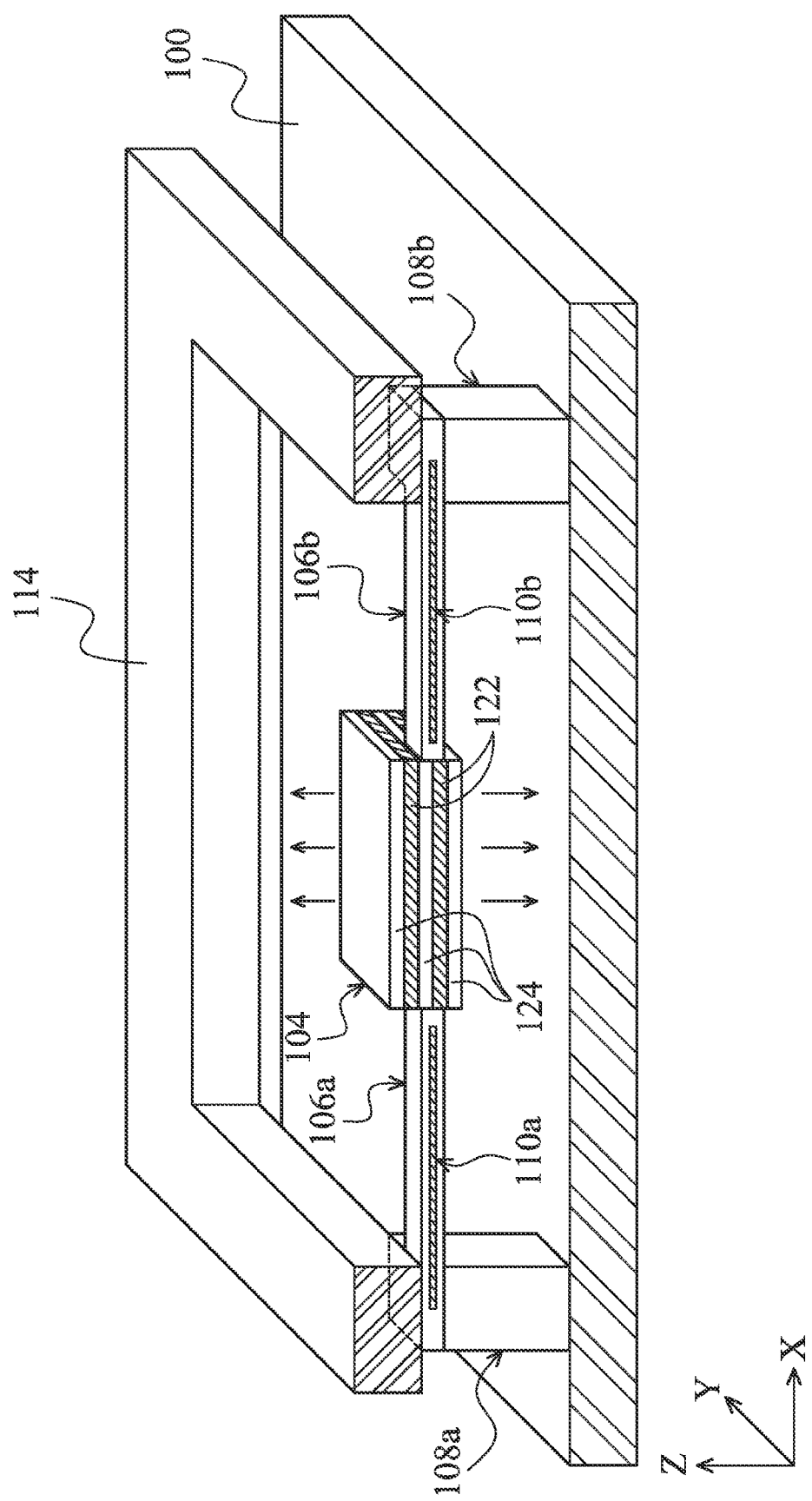
FIG. 6 is a schematic cross section taken along a line 6-6 in FIG. 5.

In FIG. 6, a schematic perspective diagram taken along a line 6-6 in FIG. 5 is illustrated. For the purpose of simplicity, only components such as the passivation layer 114, the cantilever beams 106a and 106b, the anchors 108a and 108b, the proof mass 104 and the substrate 100 are illustrated. The proof mass 104 is formed by stacking and interleaving one or a plurality of conductive layers 122 and the dielectric layers 124 together, and a region covered by the passivation layer 114 is substantially where the support frame 102 is. Herein, the proof mass 104 is under a static status not sensing exterior stresses, such that the proof mass 104, the cantilever beams 106a and 106b, and the piezoresistive material layers 110a and 110b are substantially parallel with the X-Y plane of the substrate 100.

Figure 7:
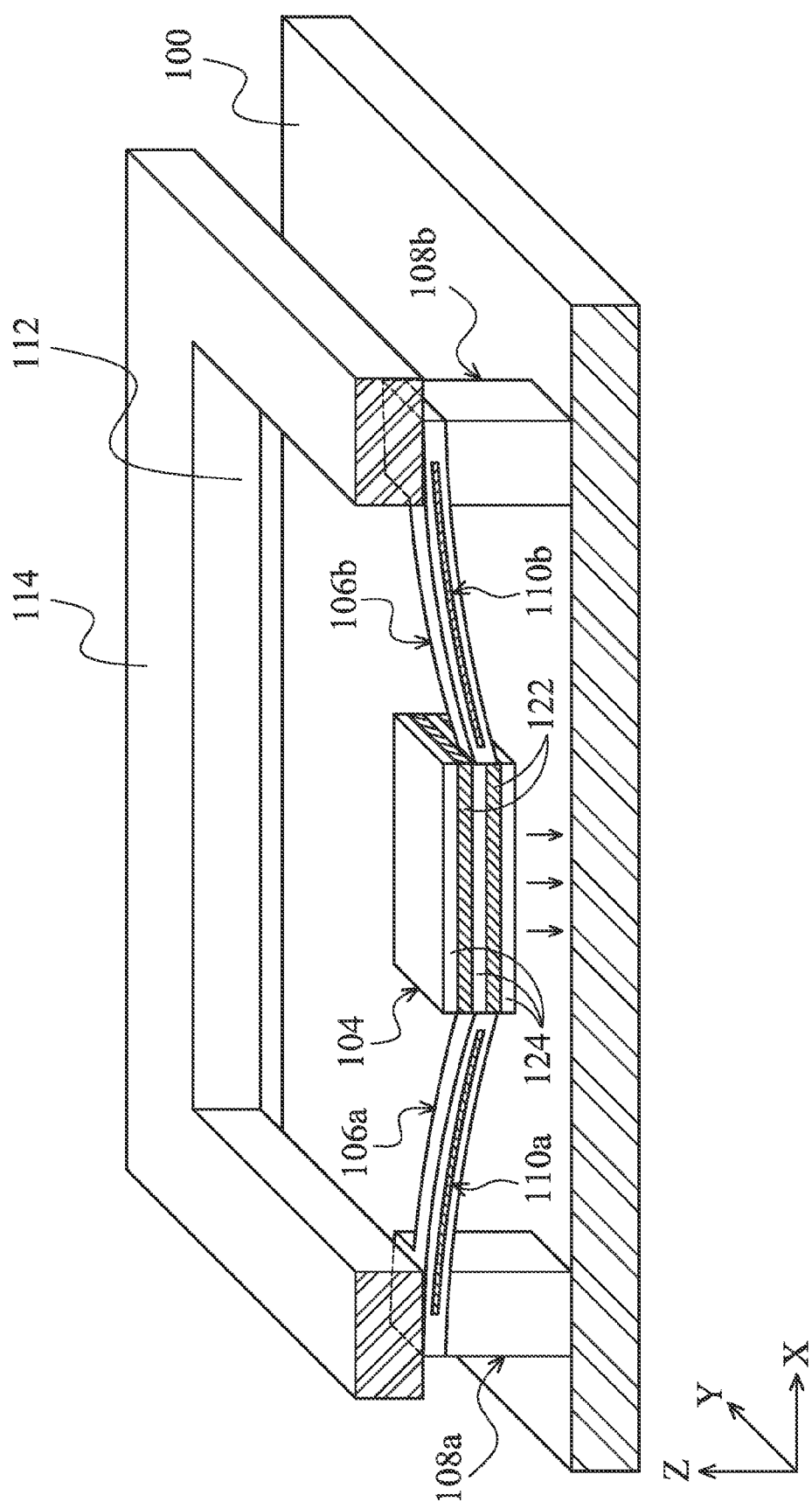
FIG. 7 is a schematic perspective view illustrating that the piezoresistive type Z-axis accelerometer in FIG. 6 has sensed exterior accelerations.

As shown in FIG. 7, a schematic perspective view shows that the piezoresistive type Z-axis accelerometer of FIG. 6 has sensed exterior accelerations. When the exterior accelerations are being sensed, the proof mass 104 performs inertia movements along a Z-axis direction in perpendicular to the X-Y plane, thereby causing deformation of the cantilever beams 106a and 106b, and changing stress distribution over the cantilever beams 106a and 106b, such that a resistance of the piezoresistive material layers 110a and 110b respectively in the cantilever beams 106a and 106b is changed. Therefore, a voltage at two ends of the wheatstone bridge (not shown) that electrically connects with the piezoresistive material layers 110a and 110b is changed and an acceleration along the Z-axis direction can be obtained by analyzing an output voltage from the wheatstone bridge by an instrument amplifier (not shown).

Herein, the piezoresistive type Z-axis accelerometer shown in FIGS. 5-7 has the following advantages when compared with the piezoresistive type Z-axis accelerometer shown in FIGS. 1-4. First, the proof mass 104 is connected to the different anchors 108a and 108b in the support frame 102 by a pair of cantilever beams 106a and 106b, such that a sensitivity of the piezoresistor in the cantilever beam 106a (i.e. the piezoresistive material layer 110a) and a sensitivity of the piezoresistor in the cantilever beam 106b (i.e. the piezoresistive material layer 110b) can be controlled by the pair of the cantilever beams 106a and 106b and may not be too sensitive, thereby improving a reliability of the piezoresistive type Z-axis accelerometer. Second, due to connections between the proof mass 104 with the anchors 108a and 108b in the support frame 102 being achieved by the pair of cantilever beams 106a and 106b, mechanical damages such as cracking may be reduced or not happened at the multiple connections between the cantilever beams 106a and 106b and the anchors 108a and 108b as the number of times the proof mass 104 in the piezoresistive type Z-axis accelerometer is moved is increased, such that a reliability thereof is improved.

Figure 8:
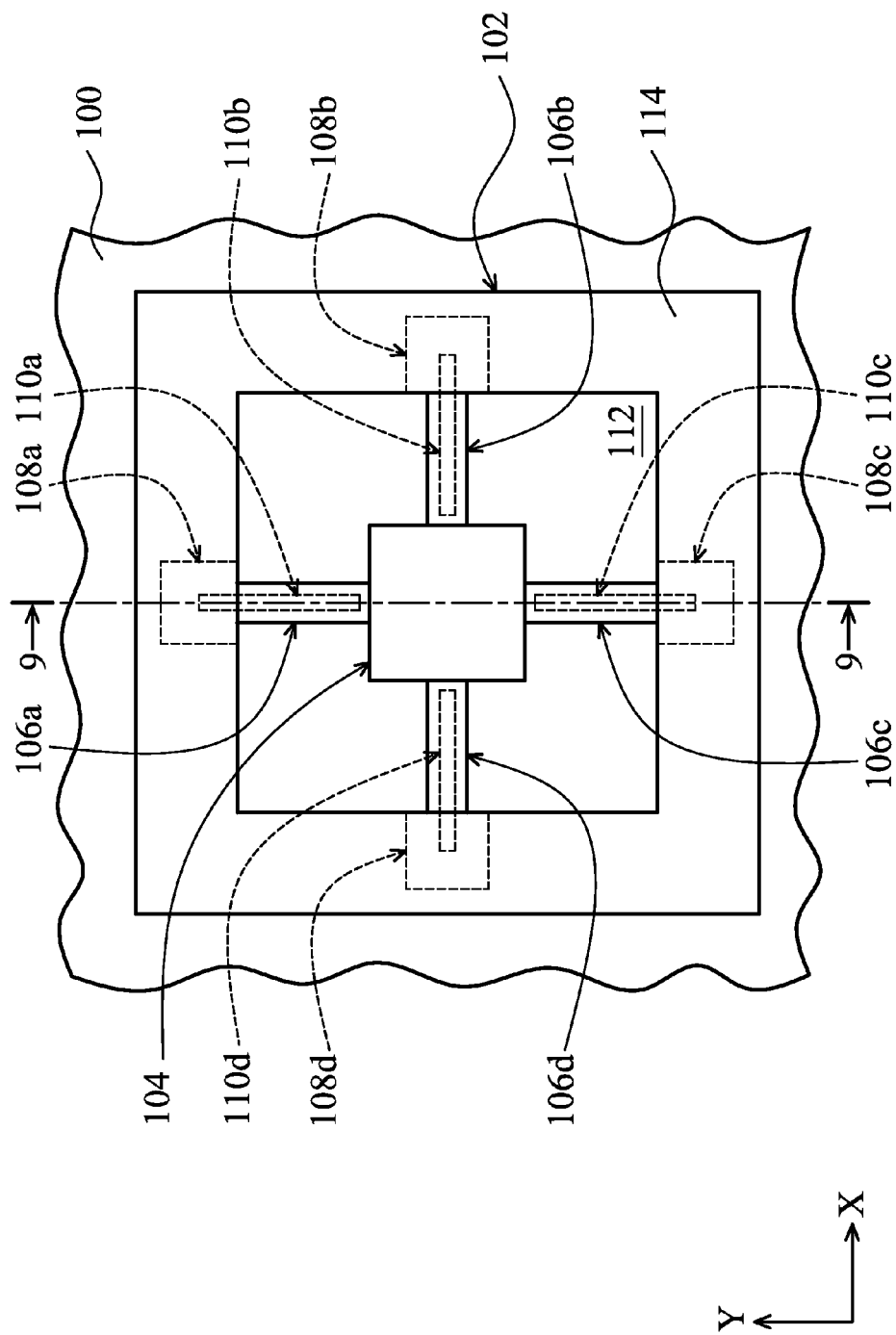
FIG. 8 is a schematic top view of a piezoresistive type Z-axis accelerometer according to yet another embodiment of the invention.

In FIG. 8, a schematic top view of yet another exemplary piezoresistive type Z-axis accelerometer is illustrated. As shown in FIG. 8, the exemplary piezoresistive type Z-axis accelerometer is similar with that illustrated in FIG. 1, and a difference therebetween is that four sides of the proof mass 104 in this embodiment are respectively connected with a side of four individual cantilever beams 106a, 106b, 106c and 106d, and the other side of the individual cantilever beams 106a, 106b, 106c and 106d not connecting with the proof mass 104 is respectively connected with one of the four anchors 108a, 108b, 108c and 108d formed in the support frame 102. Moreover, the piezoresistive type Z-axis accelerometer in this embodiment comprises four piezoresistive material layers 110a, 110b, 110c and 110d (illustrated with dotted line here) to function as four piezoresistors, and this four piezoresistive material layers 110a, 110b, 110c and 110d are respectively embedded in one of the four cantilever beams 106a, 106b, 106c and 106d. As shown in FIG. 8, the piezoresistive material layers 110a, 110b, 110c and 110d of the piezoresistive type Z-axis accelerometer can be connected in series to form a sensing resistor in a wheatstone bridge (not shown). In this embodiment, configurations of the anchors 108a, 108b, 108c and 108d, the cantilever beams 106a, 106b, 106c and 106d, and the piezoresistive material layers 110a, 110b, 110c and 110d are similar with the configurations of the anchor 108, the cantilever beam 106 and the piezoresistive layer 110 shown in FIGS. 1-4 and are not described and illustrated in detail here.

Figure 9:
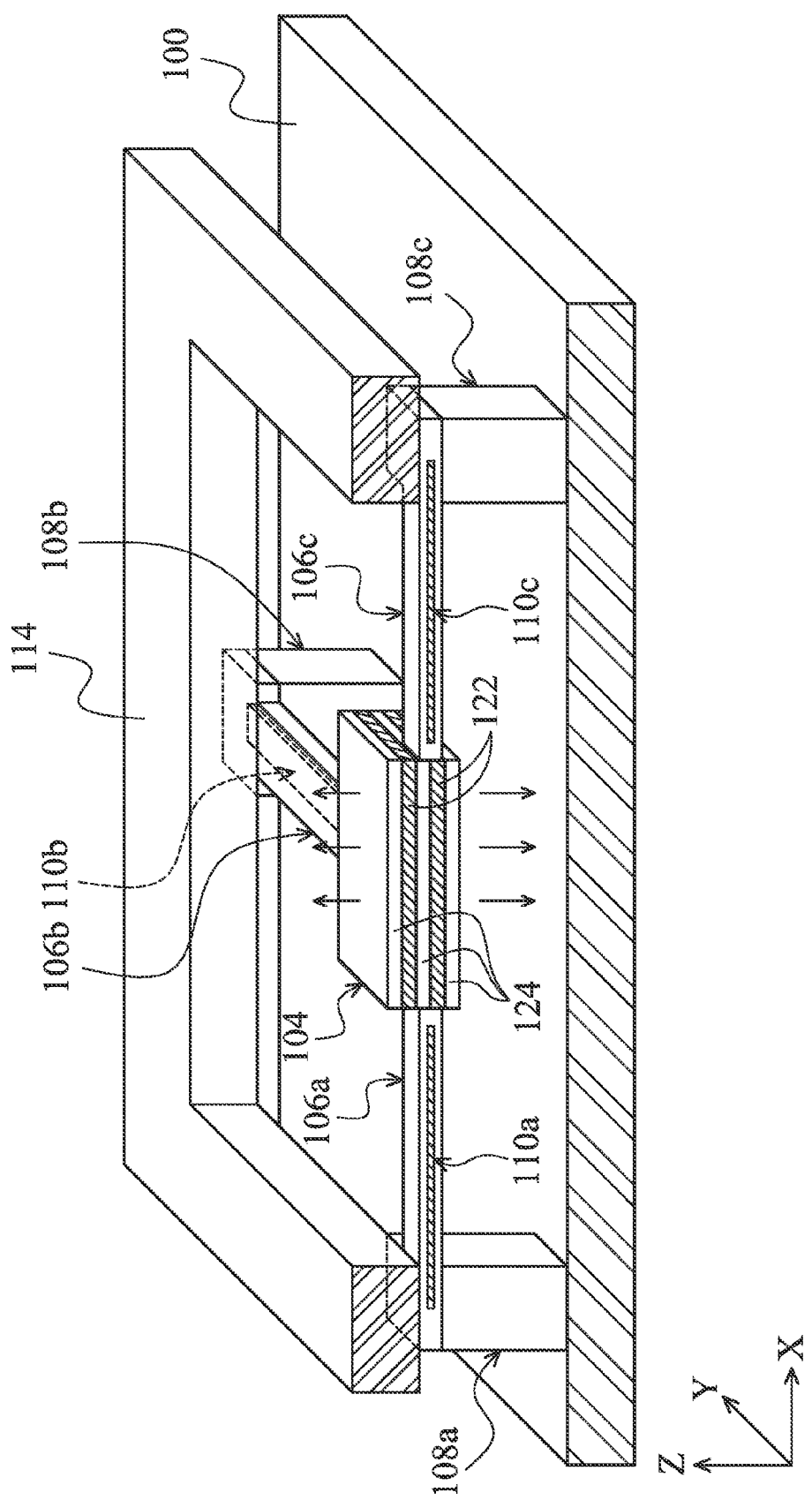
FIG. 9 is a schematic cross section taken along a line 9-9 in FIG. 8.

In FIG. 9, a schematic perspective diagram taken along a line 9-9 in FIG. 8 is illustrated. For the purpose of simplicity, only components such as the passivation layer 114, the cantilever beams 106a, 106b and 106c, the anchors 108a, 108b and 108c, the proof mass 104 and the substrate 100 are illustrated. The proof mass 104 is formed by stacking and interleaving one or a plurality of conductive layers 122 and the dielectric layers 124 together, and a region covered by the passivation layer 114 is substantially where the support frame 102 is. Herein, the proof mass 104 is under a static status not sensing exterior stresses, such that the proof mass 104, the cantilever beams 106a and 106b, and the piezoresistive material layers 110a and 110b are substantially parallel with the X-Y plane of the substrate 100.

Figure 10:
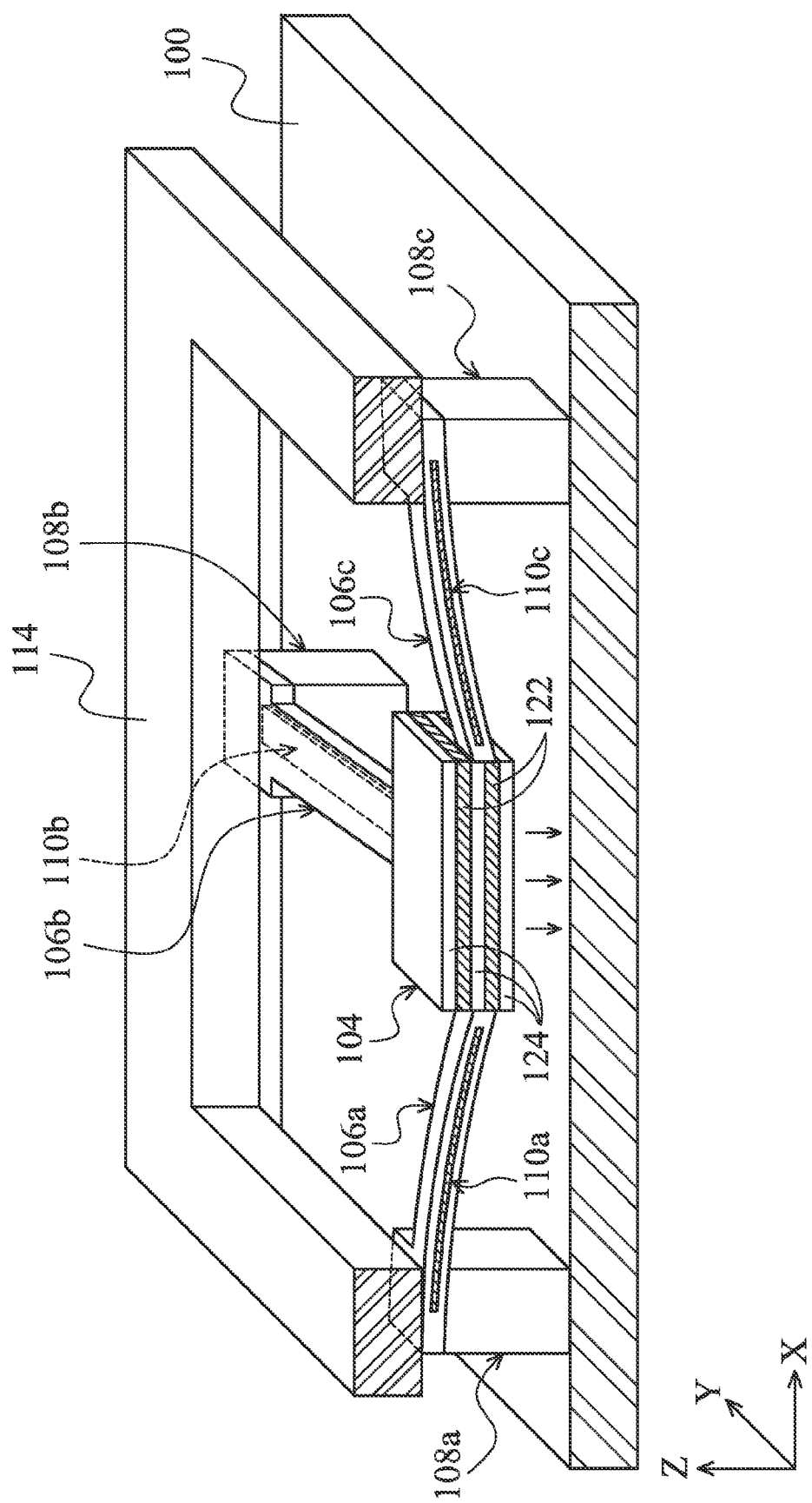
FIG. 10 is a schematic perspective view illustrating that the piezoresistive type Z-axis accelerometer in FIG. 9 has sensed exterior accelerations.

As shown in FIG. 10, a schematic perspective view shows that the piezoresistive type Z-axis accelerometer of FIG. 9 has sensed exterior accelerations. When the exterior accelerations are being sensed, the proof mass 104 performs inertia movements along a Z-axis direction in perpendicular to the X-Y plane, thereby causing deformation of the cantilever beams 106a, 106b and 106c, and changing stress distribution over the cantilever beams 106a, 106b and 106c, such that a resistance of the piezoresistive material layers 110a, 110b and 110c respectively in the cantilever beams 106a, 106b and 106c is changed. Therefore, a voltage at two ends of the wheatstone bridge (not shown) that electrically connects with the piezoresistive material layers 110a, 110b and 110b is changed and an acceleration along the Z-axis direction can be obtained by analyzing an output voltage from the wheatstone bridge by an instrument amplifier (not shown).

Herein, the piezoresistive type Z-axis accelerometer shown in FIGS. 8-10 has the following advantages when compared with the piezoresistive type Z-axis accelerometer shown in FIGS. 1-4. First, the proof mass 104 is connected to the different anchors 108a, 108b, 108c and 108d in the support frame 102 by four cantilever beams 106a, 106b, 106c and 106d, such that a sensitivity of the piezoresistor in the cantilever beam 106a (i.e. the piezoresistive material layer 110a), a sensitivity of the piezoresistor in the cantilever beam 106b (i.e. the piezoresistive material layer 110b), a sensitivity of the piezoresistor in the cantilever beam 106c (i.e. the piezoresistive material layer 110c), and a sensitivity of the piezoresistor in the cantilever beam 106d (i.e. the piezoresistive material layer 110d) can be controlled by the pair of the cantilever beams 106a, 106b, 106c and 106d and may not be too sensitive, thereby improving a reliability of the piezoresistive type Z-axis accelerometer. Second, due to connections between the proof mass 104 with the anchors 108a, 108b, 108c and 108d in the support frame 102 being achieved by the four cantilever beams 106a, 106b, 106c and 106b, mechanical damages such as cracking may be reduced or not happened at the multiple connections between the cantilever beams 106a, 106b, 106c, and 106b and the anchors 108a, 108b, 108c and 108b as the number of times the proof mass 104 in the piezoresistive type Z-axis accelerometer is moved is increased, such that a reliability thereof is improved.

In the configurations of the piezoresistive type Z-axis accelerometer shown in FIGS. 5-10, a pair or two pairs of anchors 108a, 108b, 108c and 108d of a symmetrical structure and a pair or two pairs of the cantilever beams 106a, 106b, 106c, and 106d of a symmetrical structure are formed therein. However, the piezoresistive type Z-axis accelerometer is not limited by the configurations and anchors and cantilever beams of asymmetrical structures can be also formed in a piezoresistive type Z-axis accelerometer.

Figure 11:
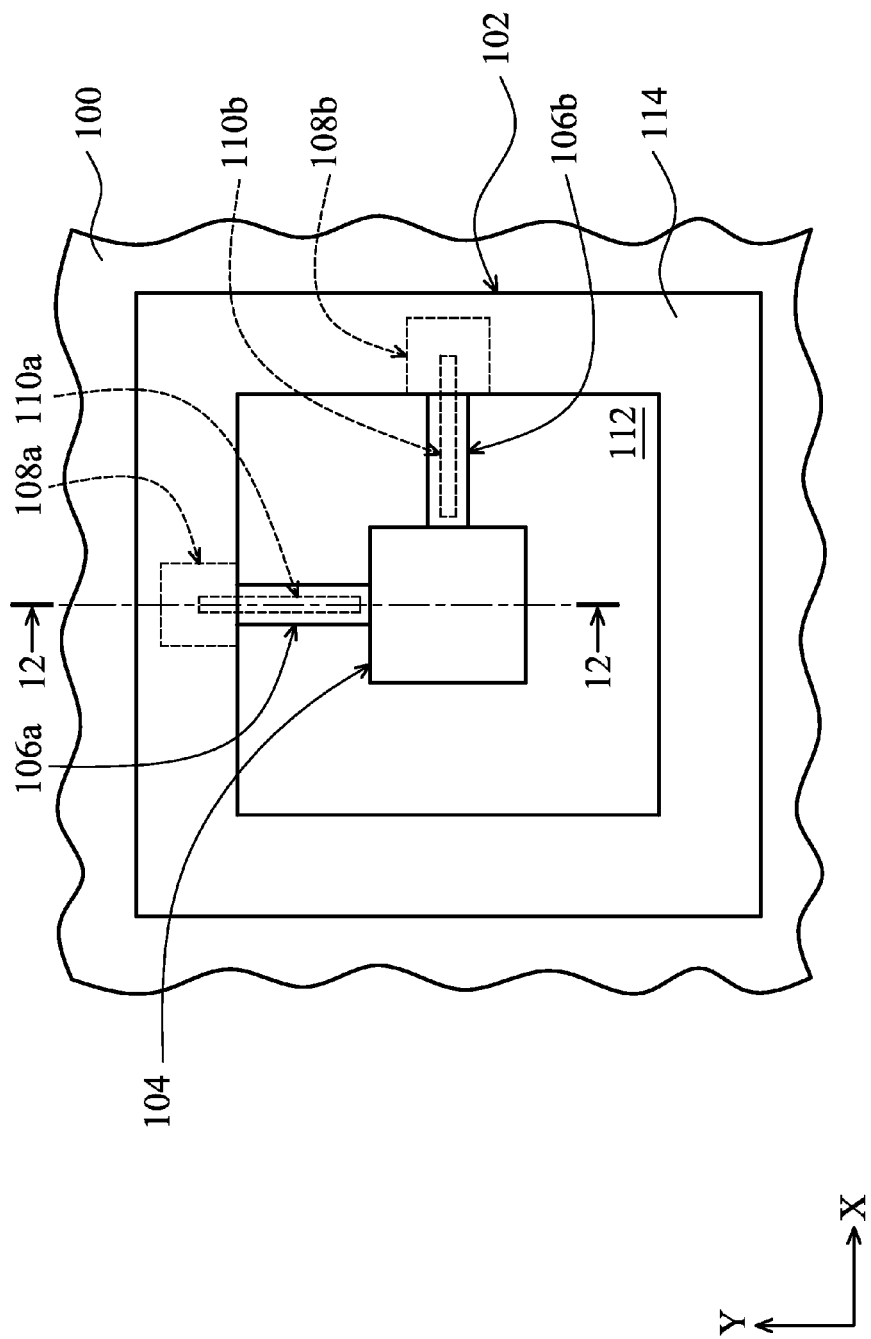
FIG. 11 is a schematic top view of a piezoresistive type Z-axis accelerometer according to another embodiment of the invention.

In FIG. 11, a schematic top view of another exemplary piezoresistive type Z-axis accelerometer is illustrated. As shown in FIG. 11, the exemplary piezoresistive type Z-axis accelerometer is similar with that illustrated in FIG. 5, and a difference therebetween is that two adjacent sides of the proof mass 104 in this embodiment are respectively connected with a side of two individual cantilever beams 106a and 106b, and the other side of the individual cantilever beams 106a and 106b not connecting with the proof mass 104 is respectively connected with one of the anchors 108a and 108b formed in the support frame 102. Moreover, the piezoresistive type Z-axis accelerometer in this embodiment comprises two piezoresistive material layers 110a and 110b (illustrated with dotted line here) to function as two piezoresistors, and two piezoresistive material layers 110a and 110b are respectively embedded in one of the cantilever beams 106a and 106b. As shown in FIG. 11, the piezoresistive material layers 110a and 110b of the piezoresistive type Z-axis accelerometer can be connected in series to form a sensing resistor in a wheatstone bridge (not shown). In this embodiment, configurations of the anchors 108a and 108b, the cantilever beams 106a and 106b, and the piezoresistive material layers 110a and 110b are similar with the configurations of the anchor 108, the cantilever beam 106 and the piezoresistive layer 110 shown in FIGS. 1-4 and are not described and illustrated in detail here.

Figure 12:
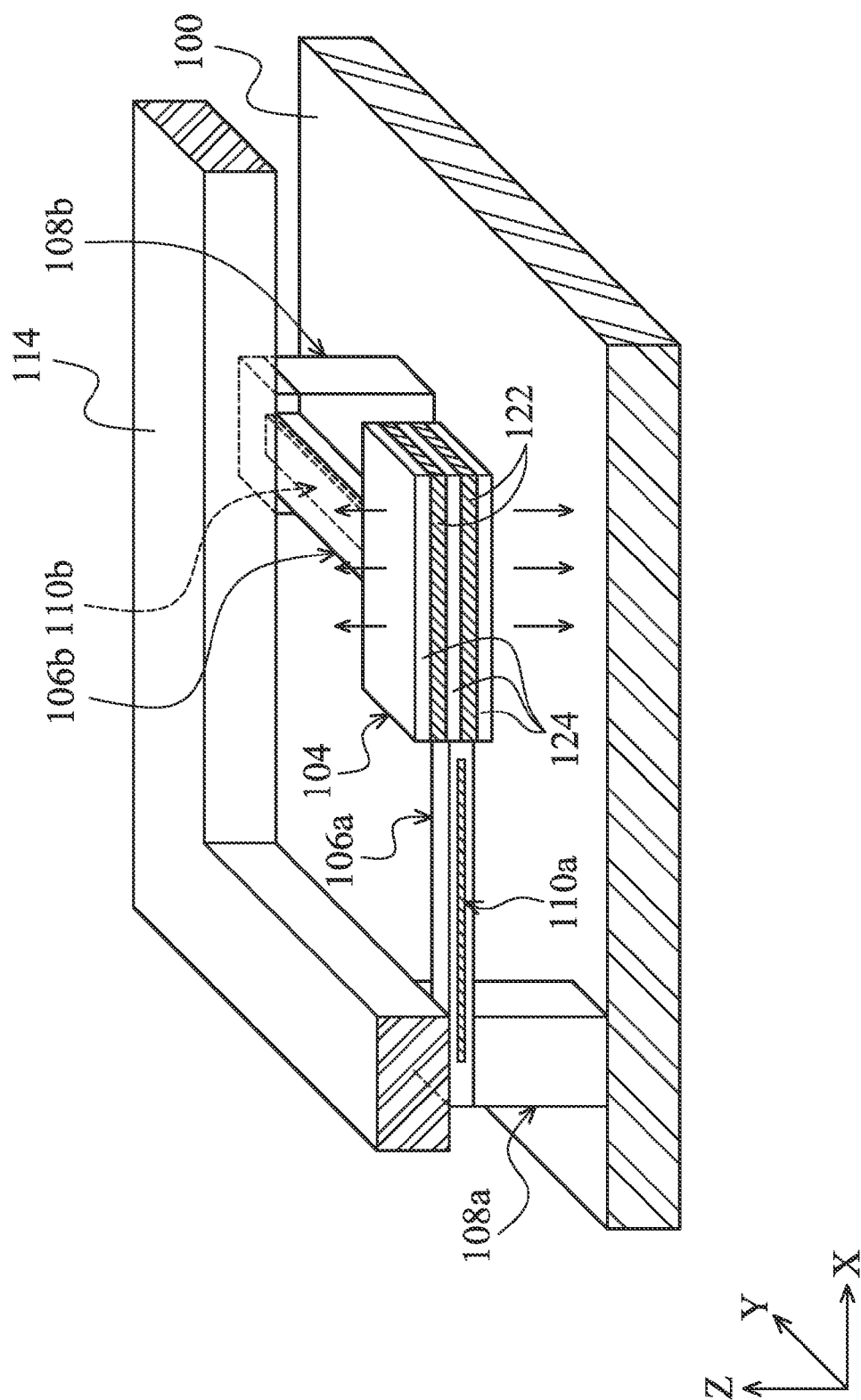
FIG. 12 is a schematic cross section taken along a line 12-12 in FIG. 11.

In FIG. 12, a schematic perspective diagram taken along a line 12-12 in FIG. 11 is illustrated. For the purpose of simplicity, only components such as the passivation layer 114, the cantilever beams 106a and 106b, the anchors 108a and 108b, the proof mass 104 and the substrate 100 are illustrated. The proof mass 104 is formed by stacking and interleaving one or a plurality of conductive layers 122 and the dielectric layers 124 together, and a region covered by the passivation layer 114 is substantially where the support frame 102 is. Herein, the proof mass 104 is under a static status not sensing exterior stresses, such that the proof mass 104, the cantilever beams 106a and 106b, and the piezoresistive material layers 110a and 110b are substantially parallel with the X-Y plane of the substrate 100. A schematic perspective view of the piezoresistive type Z-axis accelerometer shown in FIGS. 11-12 during sensing exterior accelerations and operations thereof is similar with that illustrated in FIG. 7 and is not described and illustrated in detail here.

Figure 13:
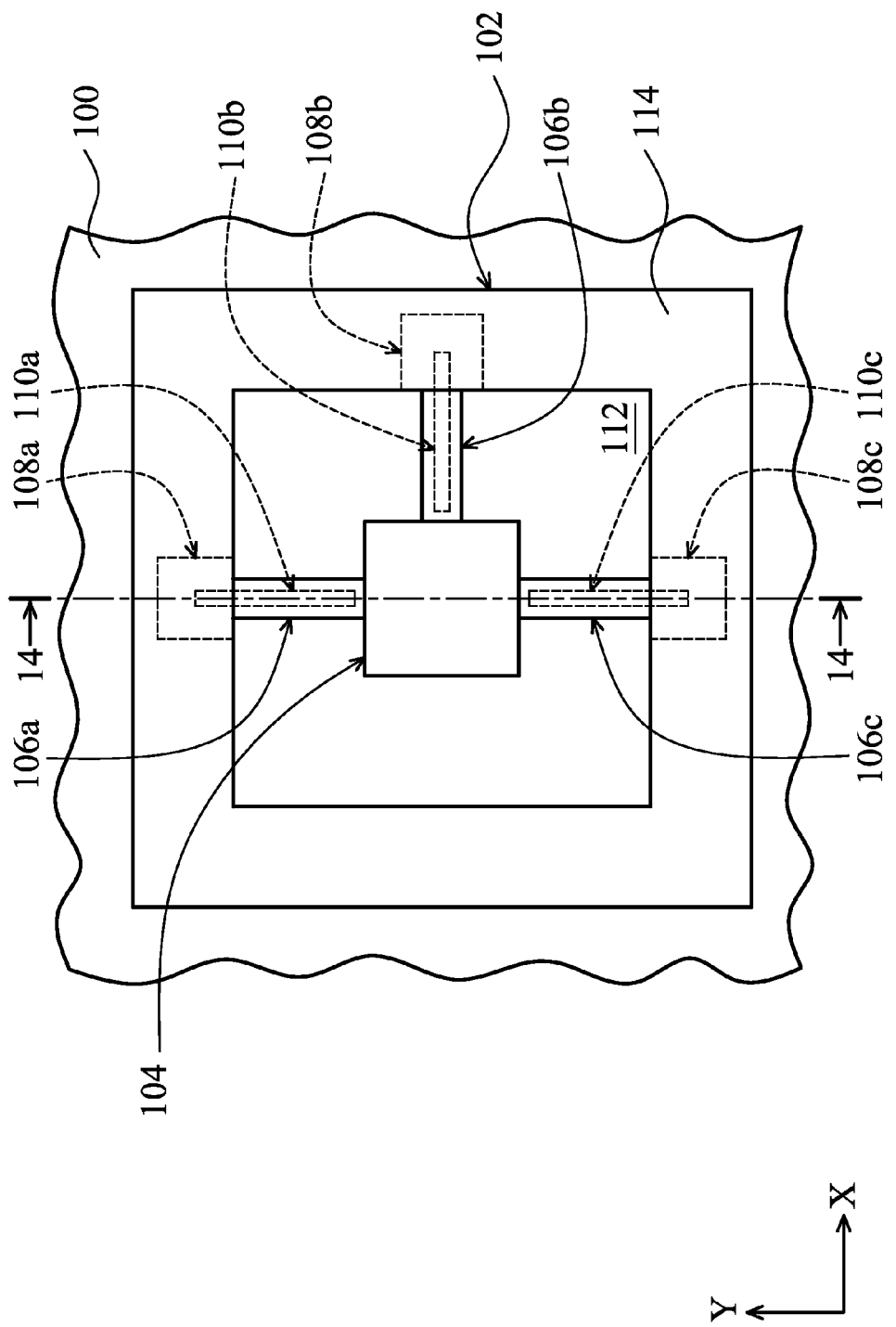
FIG. 13 is a schematic top view of a piezoresistive type Z-axis accelerometer according to yet another embodiment of the invention.

In FIG. 13, a schematic top view of yet another exemplary piezoresistive type Z-axis accelerometer is illustrated. As shown in FIG. 13, the exemplary piezoresistive type Z-axis accelerometer is similar with that illustrated in FIG. 8, and a difference therebetween is that three adjacent sides of the proof mass 104 in this embodiment are respectively connected with a side of three individual cantilever beams 106a, 106b and 106c, and the other side of the individual cantilever beams 106a, 106b and 106b not connecting with the proof mass 104 is respectively connected with one of the anchors 108a, 108b and 108c formed in the support frame 102. Moreover, the piezoresistive type Z-axis accelerometer in this embodiment comprises three piezoresistive material layers 110a, 110b and 110c (illustrated with dotted line here) to function as three piezoresistors, and the three piezoresistive material layers 110a, 110b and 110c are respectively embedded in one of the cantilever beams 106a, 106b and 106c. As shown in FIG. 13, the piezoresistive material layers 110a, 110b and 110c of the piezoresistive type Z-axis accelerometer can be connected in series to form a sensing resistor in a wheatstone bridge (not shown). In this embodiment, configurations of the anchors 108a, 108b and 108c, the cantilever beams 106a, 106b and 106c, and the piezoresistive material layers 110a, 110b and 110c are similar with the configurations of the anchor 108, the cantilever beam 106 and the piezoresistive layer 110 shown in FIGS. 1-4 and are not described and illustrated in detail here.

Figure 14:
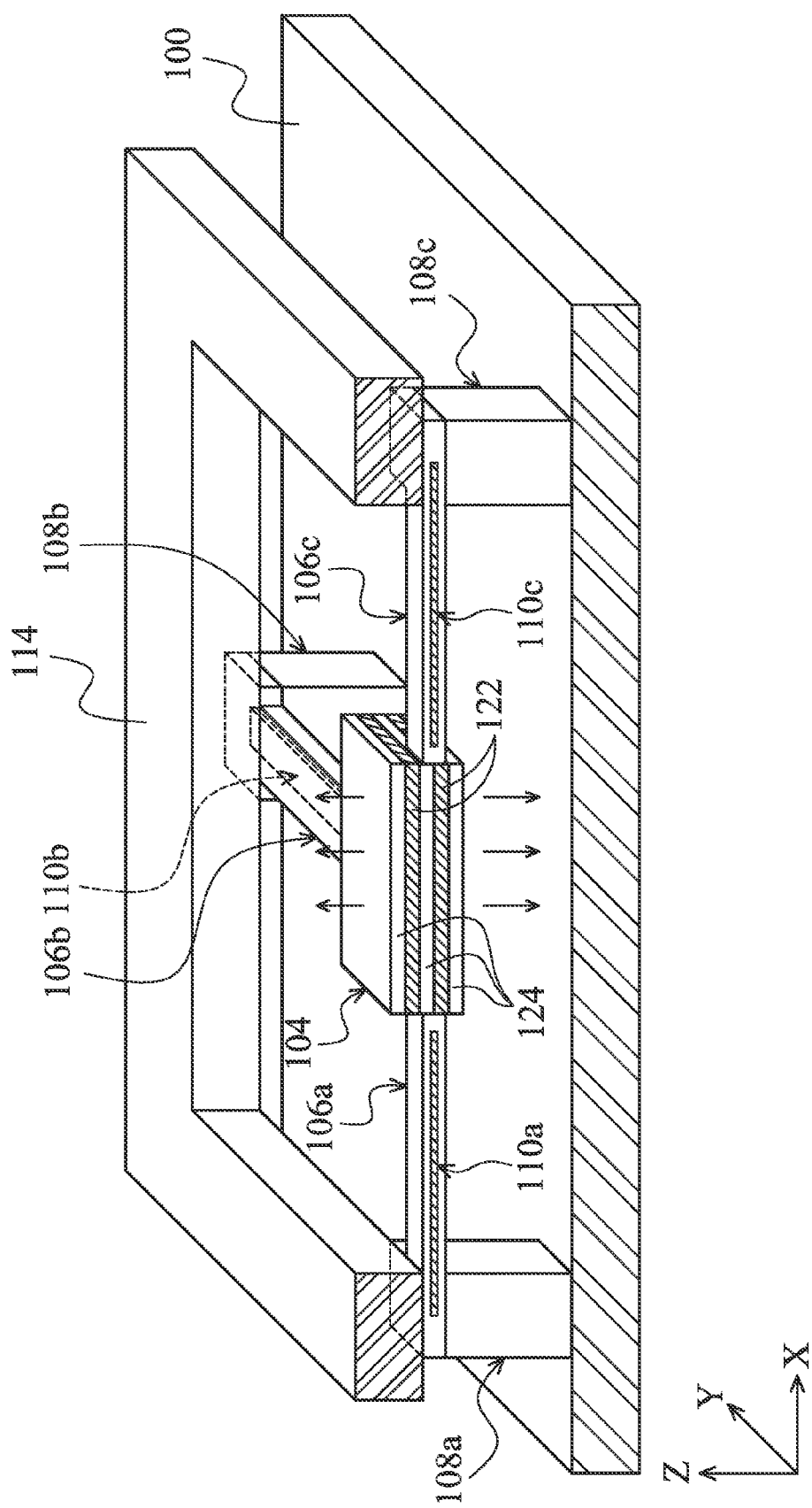
FIG. 14 is a schematic cross section taken along a line 14-14 in FIG. 13.

In FIG. 14, a schematic perspective diagram taken along a line 14-14 in FIG. 13 is illustrated. For the purpose of simplicity, only components such as the passivation layer 114, the cantilever beams 106a, 106b and 106c, the anchors 108a, 108b, and 108c, the proof mass 104 and the substrate 100 are illustrated. The proof mass 104 is formed by stacking and interleaving one or a plurality of conductive layers 122 and the dielectric layers 124 together and a region covered by the passivation layer 114 is substantially where the support frame 102 is. Herein, the proof mass 104 is under a static status not sensing exterior stresses, such that the proof mass 104, the cantilever beams 106a, 106b and 106c, and the piezoresistive material layers 110a, 110b and 110c are substantially parallel with the X-Y plane of the substrate 100. A schematic perspective view of the piezoresistive type Z-axis accelerometer shown in FIGS. 13-14 when sensing exterior accelerations and operations thereof is similar with that illustrated in FIG. 10 and is not described and illustrated in detail here.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A piezoresistive type Z-axis accelerometer, comprising:
   a substrate;
   a plurality of anchors formed over the substrate;
   a plurality of cantilever beams, wherein the cantilever beams comprise a plurality of dielectric layers and a piezoresistive material in one of the dielectric layers embedded within the cantilever beams;
   a proof mass, wherein the proof mass is suspended over the substrate by respectively connecting the proof mass with the anchors, and the accelerometer senses a movement of the proof mass by the piezoresistive material; and
   a support frame formed over the substrate and surrounding the anchors, the cantilever beams and the proof mass, wherein the anchors are integrated with the support frame, and the piezoresistive material is embedded in the cantilever beams and further extends into a portion of the support frame, and substantially all surfaces of the piezoresistive material are surrounded by the dielectric layers within the cantilever beams.

2. The piezoresistive type Z-axis accelerometer as claimed in claim 1, wherein the support frame comprises an insulating layer, a plurality of dielectric layers, a plurality of conductive layers and a passivation layer disposed over the substrate, and the dielectric layer and the conductive layers are interleaved with each other and are disposed between the insulating layer and the passivation layer.

3. The piezoresistive type Z-axis accelerometer as claimed in claim 2, wherein the support frame defines a cavity within the support frame over a portion of the substrate.

4. The piezoresistive type Z-axis accelerometer as claimed in claim 3, further comprising a recess formed in the substrate below the cavity, and the recess partially extends below the support frame.

5. The piezoresistive type Z-axis accelerometer as claimed in claim 1, wherein the piezoresistive material in the cantilever beams is electrically connected in series.

6. The piezoresistive type Z-axis accelerometer as claimed in claim 5, wherein the piezoresistive material in the cantilever beams is connected in series to form a sensing resistor of a wheatstone bridge.

7. The piezoresistive type Z-axis accelerometer as claimed in claim 6, wherein the wheatstone bridge is electrically connected to an instrument amplifier.

8. The piezoresistive type Z-axis accelerometer as claimed in claim 1, wherein the anchors and the cantilever beams comprise a pair of anchors of a symmetrical structure and a pair of cantilever beams of a symmetrical structure.

9. The piezoresistive type Z-axis accelerometer as claimed in claim 1, wherein anchors and the cantilever beams comprise two pairs of anchors of a symmetrical structure and two pairs of cantilever beams of a symmetrical structure.

10. The piezoresistive type Z-axis accelerometer as claimed in claim 1, wherein the anchors and the cantilever beams comprise a pair of anchors of an asymmetrical structure and a pair of cantilever beams of an asymmetrical structure.

11. The piezoresistive type Z-axis accelerometer as claimed in claim 1, wherein the piezoresistive material comprises polysilicon.

12. The piezoresistive type Z-axis accelerometer as claimed in claim 1, wherein the proof mass comprises one or more dielectric layers and one or more conductive layers.

13. The piezoresistive type Z-axis accelerometer as claimed in claim 1, wherein the cantilever beams are connected with two adjacent sides of the proof mass.

14. The piezoresistive type Z-axis accelerometer as claimed in claim 1, wherein the cantilever beams are connected with three sides of the proof mass, and any two of the cantilever beams are adjacent to each other.

15. The piezoresistive type Z-axis accelerometer as claimed in claim 1, wherein the support frame is formed with a rectangular configuration from a top view thereof.

\* \* \* \* \*